United States Patent [19]

Kissel

[11] 4,236,685
[45] Dec. 2, 1980

[54] STEERING MECHANISM WITH AN ACTIVE FORCE FEEDBACK, ESPECIALLY FOR AIRCRAFT

[75] Inventor: Gerhard K. Kissel, Ottobrunn, Fed. Rep. of Germany

[73] Assignee: Messerschmitt-Boelkow-Blohm Gesellschaft mit beschraenkter Haftung, Munich, Fed. Rep. of Germany

[21] Appl. No.: 13,748

[22] Filed: Feb. 21, 1979

[30] Foreign Application Priority Data

Feb. 24, 1978 [DE] Fed. Rep. of Germany ....... 2807902

[51] Int. Cl.³ .................. G05D 1/08; G64C 13/04
[52] U.S. Cl. .................................. 244/223; 244/178; 244/195; 244/196; 244/197
[58] Field of Search .................. 244/196, 83 D, 197, 244/83 E, 83 F, 83 G, 178, 180, 181, 195, 194; 91/363 A, 363 R; 318/628, 584, 585, 586, 580

[56] References Cited

U.S. PATENT DOCUMENTS

| | | | |
|---|---|---|---|
| 3,493,826 | 2/1970 | Wandrey | 244/178 X |
| 3,520,499 | 7/1970 | Ask | 244/17.13 X |
| 4,095,763 | 6/1978 | Builta | 91/363 A X |

*Primary Examiner*—Reinhard J. Eisenzopf
*Attorney, Agent, or Firm*—W. G. Fasse; D. F. Gould

[57] ABSTRACT

The present steering mechanism, especially for an aircraft includes a manually operable steering member and an automatic steering system. A difference signal formed from a pilot input and trim signal and from a gyro feedback signal is supplied to a force control and damping circuit twice, once directly and once through an authority limit circuit. The output of the authority limit circuit is also supplied to the motors forming part of the automatic steering system. The force control and damping circuit also receives further input signal or signals representing steering information. The output of the force control and damping circuit is connected to the feel unit of the steering system, whereby an immediate manual control by the pilot is effective, however limited against an excessive control or so-called manual over control.

6 Claims, 5 Drawing Figures

STEERING MECHANISM WITH AN ACTIVE FORCE FEEDBACK, ESPECIALLY FOR AIRCRAFT

BACKGROUND OF THE INVENTION

The present invention relates to a steering mechanism with an active force feedback, especially for aircraft. Such a mechanism includes a manually operable steering member for the actuation of the rudder, aileron or elevator components as well as an automatic steering system arranged for cooperation with the manually operable steering member.

Various modifications of such steering mechanism are known in the art. For example, German Patent Publication (DAS) No. 1,053,941 discloses a manual aircraft steering device combined with an automatic steering system, whereby elastic deformations caused by the manual steering lever overcome or at least suppress the stabilizing force of the servo devices. These elastic deformations also displace the manually operable member and generate respective signals which are supplied to the servo system in order to actuate the member to be controlled in accordance with the manually applied muscle power. In this known system the signals are generated only, or rather they become effective only when the force caused by the elastic deformation of the manual steering member has been effective for a sufficient length of time. Thus, in the just mentioned prior art system the cooperation between the manual steering device and the automatic steering system shall be such and the manual control member or stick shall be arranged in such a manner that in response to the application of a sufficient muscle power the stick directly controls or adjusts the member to be controlled, that is, the flap or the rudder. Hence, this type of arrangement does not eliminate the danger of an over control or over steering of the aircraft. Further, the known apparatus has a built in delay between the stick actuation and the response movement of the controlled member because, as mentioned, the signals caused by the elastic deformation become effective only after they have been present for a predetermined length of time. Thus, this known device operates too slow for use in supersonic aircraft.

In order to avoid such delays, German Patent Publication (DOS) No. 2,125,358 suggests a steering mechanism with a metering instrument for sensing the combined effect of the two steering transmission systems and for supplying a signal in the non-mechanical steering system by means of a feedback loop whereby the effect of the mechanical system is neutralized by the effect of the non-mechanical system when the latter is in operation. This known system comprises a control switch for displacing the steering member of the steering system in response to signals of the non-mechanical system. In addition, the mechanical system is directly connected with the control member of the steering mechanism.

In the device according to German Patent Publication (DOS) No. 2,125,358 the mechanical system is continuously connected, however, its effect on the motor or servomotor is eliminated by the effect of the feedback loop. However, when the non-mechanical steering system becomes ineffective, the mechanical steering system is already switched on or rather, in operation so that an effective steering of the motor is assured at all times. However, this type of system cannot prevent that steering impulses caused by the pilot are too large or too quick, thereby causing critical flight conditions.

The steering mechanisms of the above described type or of similar type have been provided with damping means and devices causing an artificial "steering feel", please see for example German Patent Publication (DOS) No. 2,450,158. These devices provide the "steering feel" by means of initial forces or spring forces which the pilot must overcome manually. However, once these initial forces have been overcome, they do not prevent an oversteering of the aircraft.

Summarizing, systems of the prior art substantially operate with control stick forces adjusted to a fixed point or programmed in accordance with the flight range and the aircraft configuration. However, such systems do not take into account the dynamics of the aircraft nor the dynamics of the control or steering mechanism.

OBJECTS OF THE INVENTION

In view of the above it is the aim of the invention to achieve the following objects singly or in combination:

to provide a steering mechanism wherein the manual control means of the pilot are subjected to a counter force and/or damping effect which corresponds to a control deviation;

to make certain that the counter force prevents the pilot from over steering the aircraft and which makes sure that steering operations performed by the pilot remain "in phase" with the aircraft to avoid dangerous flight conditions, in other words, to avoid control actions which are too rapid;

to make certain, that proper control actions of the pilot on the manual steering means or system are immediately effective on the flight conditions of the aircraft while substantially preventing any over steering;

to enable the pilot to more exactly steer the aircraft even for precision maneuvers whereby the control stick forces are respectively reduced to permit said more exact control of the aircraft; and to directly transmit the adjusted or trim position of the controlled member, such as a flap, to the steering member or control stick by a corresponding zero point shift whereby the pilot is integrated into the control or steering circuit.

SUMMARY OF THE INVENTION

According to the invention there is provided a steering mechanism with an active force feedback, especially for an aircraft including manual steering means and automatic steering means wherein the manual steering means cooperates with a summation amplifier which receives the pilot trim command signal and a gyro feedback signal to produce a differential signal. The differential signal is supplied to an authority limit circuit and simultaneously to a pitch stick force and damping circuit also referred to as a force control and damping circuit. The output signal of the authority limit circuit is supplied to the servomotors of the automatic control system and to the pitch stick force and damping circuit. The latter also receives additional signals representing steering information, for example, signals which are proportional to the operational speed of the servomotors, signals representing the static pressure, signals representing the pressure elevation, and the normal acceleration. The output of the pitch stick force and damping circuit is supplied to a so-called "feel unit" forming part of the manual steering means.

The combination of the just mentioned features achieves a number of advantages, especially the immediate effects of the manual control system on the instantaneous flight conditions while simultaneously avoiding over steering. Precision maneuvers may be effected while the control stick forces are correspondingly reduced to permit a more exact control or steering of the aircraft. The adjusted position of the controlled members such as ailerons or tailerons is transmitted to the control stick directly by a respective zero point position displacement and the pilot again becomes part of the control or steering circuit.

BRIEF FIGURE DESCRIPTION

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

FIGS. 1a, 1b, 2a and 2b have been marked to enclose by dashed lines certain units of block components. Such units are known in the art per se and may be purchased from the following manufacturers. Thus, Unit A is known as a Pitch Computer, Model Number PN 47-008 manufactured by Marconi Elliott Rochester, Kent, England. Unit B is a lateral computer Model Number PN 47-009 manufactured by Bodenseewerke, Ueberlingen, Federal Republic of Germany. Unit C is a Pitch/YAW rate gyro, Model Number PN 11-020, manufactured by Honeywell, Maintal, Federal Republic of Germany. The same manufacturer also manufactures Unit D, a Roll Rate Gyro Part Number PN 11-021. Unit E may be provided from several manufacturers, for example, as a so-called "Short Stick Controller" Model Number PN 326.43.000.0, manufactured by Messerschmitt-Boelkow-Blohm, Munich, Federal Republic of Germany. The Unit E may, in the alternative, comprise a so-called "Feel Simulator System", Model Number PN CHA 749, and a Feel Force Jack, Model Number PN CHA 750, manufactured by Lucas Aerospace Ltd., Birmingham, England. Unit F comprises a Taileron Actuator, Model Number FYH 3606, manufactured by Fairey Hydraulic, Heston, England; and Unit G is a Rudder Actuator, Model Number FYH 3613, also manufactured by Fairey Hydraulic, Heston, England. Similarly, Unit H is a Spoiler Actuator, Model Number FYH 94528 and Model Number FYH 94582 manufactured by Fairey Hydraulic, Heston, England. Unit K is a Rudder Pedal Assembly, Model Number: P-411-006, manufactured by BAe, Warton, England.

Figure 1A:
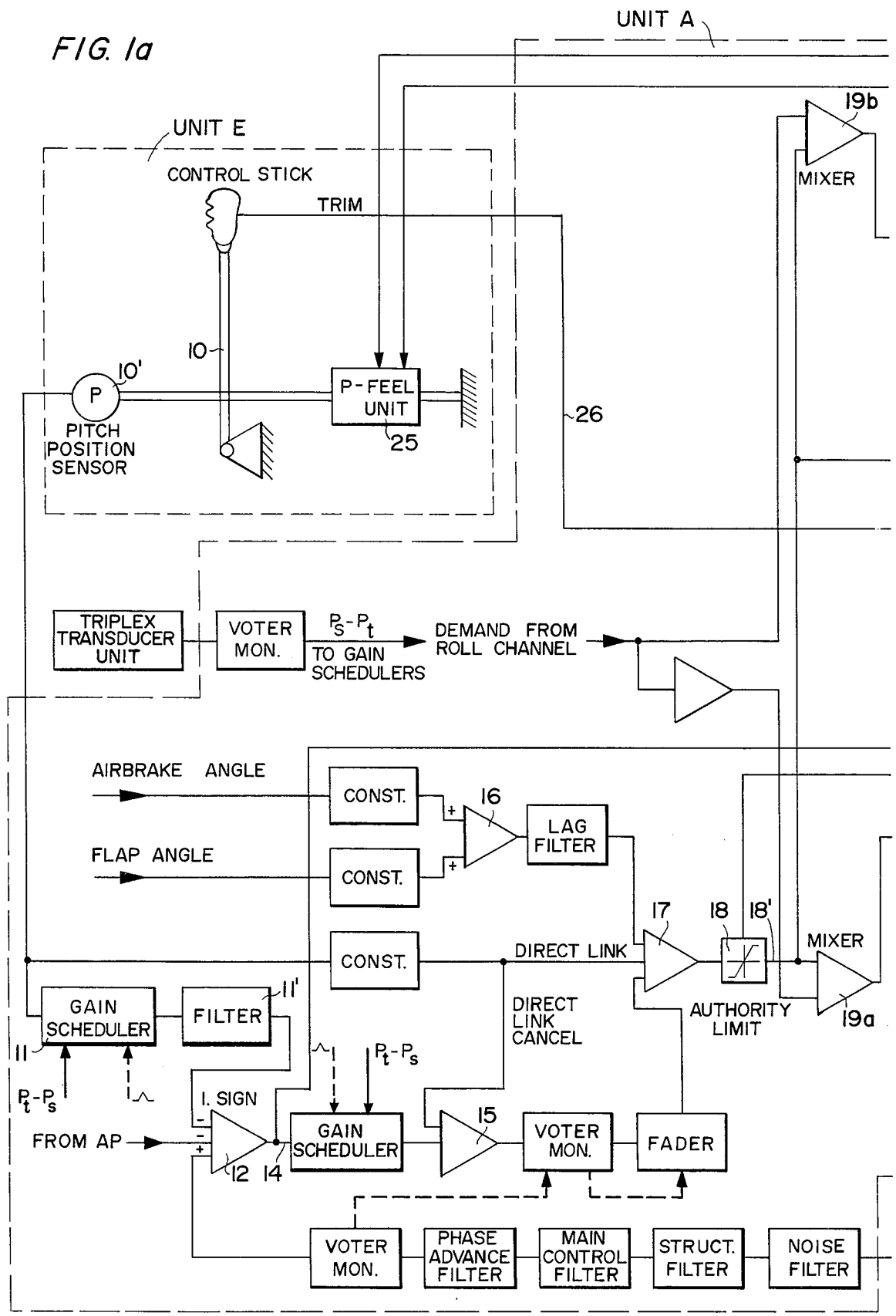
FIGS. 1a and 1b show a block circuit diagram of a steering control circuit for the aircraft movements relative to the longitudinal axis or for the altitude control.
Figure 1B:
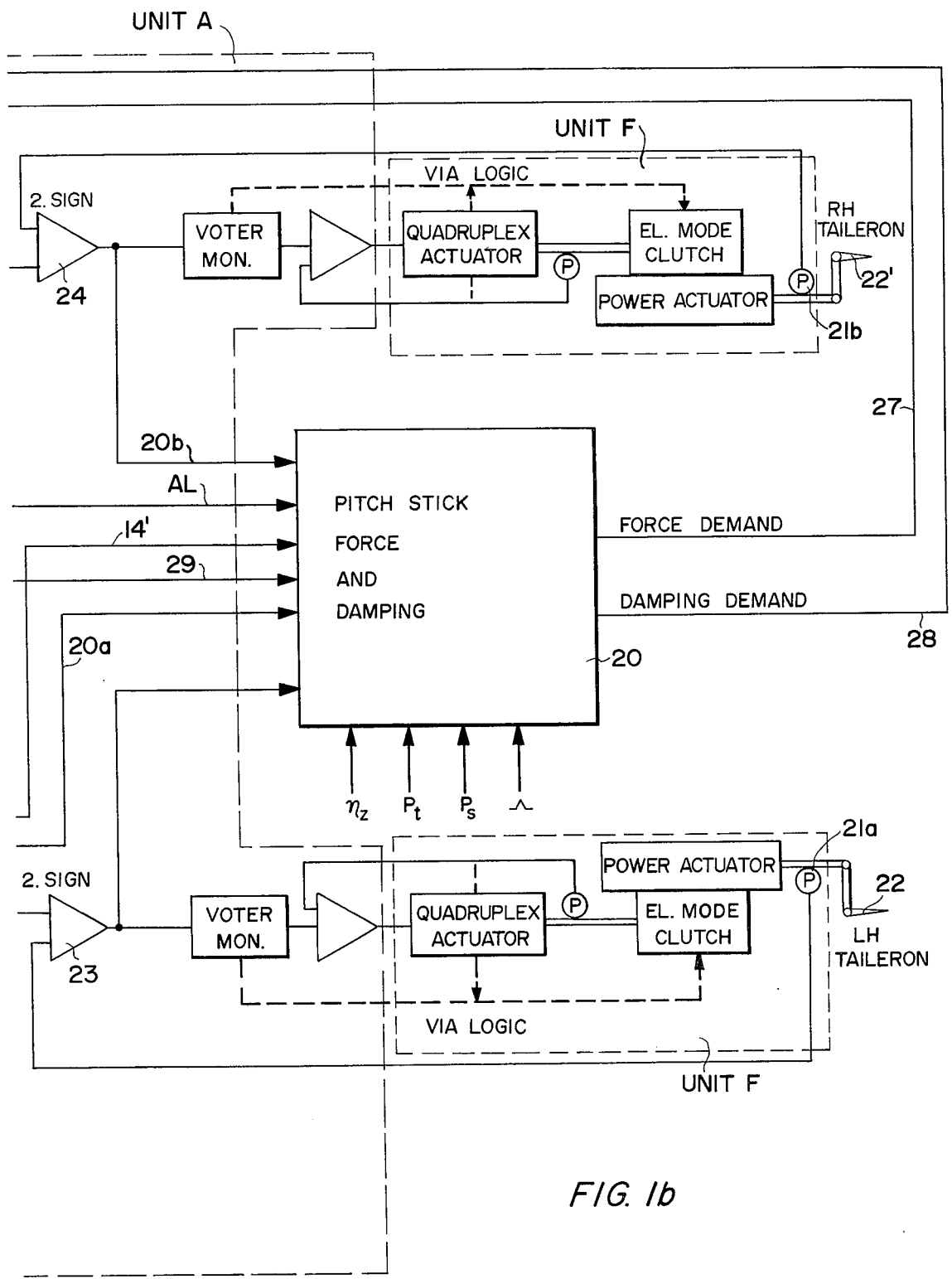

FIGS. 1a and 1b illustrate the pitch control circuit relative to the longitudinal axis of the aircraft. The pilot operates the control stick 10, whereby the pitch position sensor 10' provides a respective pilot command signal which is supplied through a gain scheduler 11 and a filter 11' to one input of a summation amplifier 12. The summation amplifier 12 has a further input connected to the pitch rate gyro 13 which constitutes the above mentioned Unit C. The summation or differential amplifier 12 also has a third input constituting the so-called auto pilot input AP. Thus, the summation amplifier 12 receives a pilot command signal or an auto pilot signal and a pitch rate gyro signal.

The output 14 of the differential amplifier 12 is, on the one hand, directly connected through a respective conductor 14' to a corresponding input of a pitch stick force and damping circuit 20 to be described in more detail below. On the other hand, the output 14 is connected through respective circuit means such as a further gain scheduler, and signal handling networks 15, 17 to an authority limit circuit 18 which is connected with its output 29 to a respective input of the pitch stick force and damping circuit 20. The signal at the output 14 of the differential amplifier 12 constitutes the difference between the rated value as provided by the pitch rate gyro 13 and the actual value as provided from the pitch position sensor 10'. The pitch stick force and damping circuit provides output signals for varying the gradient of the stick force. The pitch stick force gradient is increased, for example, in accordance with a given function inherent in the circuit 20, when the difference signal 14 increases. The summing amplifiers 15, 16 and 17 modify the difference signal 14. The authority limit circuit 18 has a further output 18' connected through a mixing (summing amplifier) circuit 19a and further circuit components such as the amplifier 23 to the Unit F or rather to the servomotor 21a in the Unit F for adjusting the left-hand rudder or taileron 22. Similarly, the output signal of the authority limit circuit 18 is supplied through the (summing amplifier) mixer 19b and an amplifier 24 to the Unit F in the upper right-hand corner of FIG. 1 for operating the servomotor 21b for adjusting the right-hand taileron 22'. The signal at the output 18' is simultaneously supplied to the authority limit input AL of the pitch stick force and damping circuit 20. Since the signal at the input AL is proportional to the position of the rudders 22, 22', it is possible to use this signal after suitable filtering for the shifting of the force null point of the force characteristic curve. When the automatic control is effective, this shifting causes an automatic control stick trimming. As soon as the signal at the input AL approaches the limit determined by the authority limit circuit 18, the latter supplies through the conductor 29 a further signal to the circuit 20 which again varies in accordance with a given function, the force of the control stick 10. For example, if the rise of the signal is too rapid, the damping characteristic is varied in accordance with a given function.

The force control and damping circuit 20 has a further input 20a at which the circuit 20 receives an input signal representing the operational speed of the servomotor 21a. Similarly, the circuit 20 receives at its input 20b a signal representing the operational speed of the servomotor 21b. These signals at the outputs of the respective amplifiers 23, 24 which are proportional to the operational speed of the servomotors 21a and 21b vary the damping demand signal at the output 28 in accordance with a predetermined function. The output 28 is connected to the pitch feel unit 25 which provides an artificial "pitch feel". The damping signal may, for example, be increased to such an extent that the pilot cannot actuate the control stick 10 in an over control manner. Stated differently, the pilot is prevented from causing operational speeds of the servomotors which would exceed the maximum operation speed of these motors.

The pitch stick force and damping circuit 20 comprises a further input 26 at which it receives in a manner known as such a pilot trim control signal which causes a shifting of the null point of the force characteristic curve. The base characteristic curve of the stick force is produced in a manner known as such by supplying to the circuit 20 signals representing the static pressure $P_s$, the pressure elevation $P_t$ and, if desired, further steering information signals corresponding, for example, to the wing lead-lag angle $\Lambda$ or to the normal acceleration $\eta_z$.

In those instances where a further adaptation of the control stick force is accomplished in response to the normal acceleration $\eta_z$ it may be possible to avoid using an adaptation in response to the above mentioned signals representing the static pressure $P_s$, the pressure elevation $P_t$, and the wing lead-lag angle $\Lambda$. This is so because the primary steering sense or "feel" for the pilot is represented by the ratio of the control stick force and the normal force.

The output signals "force demand" on the output conductor 27 and "damping demand" on the output conductor 28 are supplied to the pitch "feel" device 25 which forms part of the Unit E. These pitch feel devices 25 transform the electrical signals into respective forces as is well known in the art.

Figure 2A:
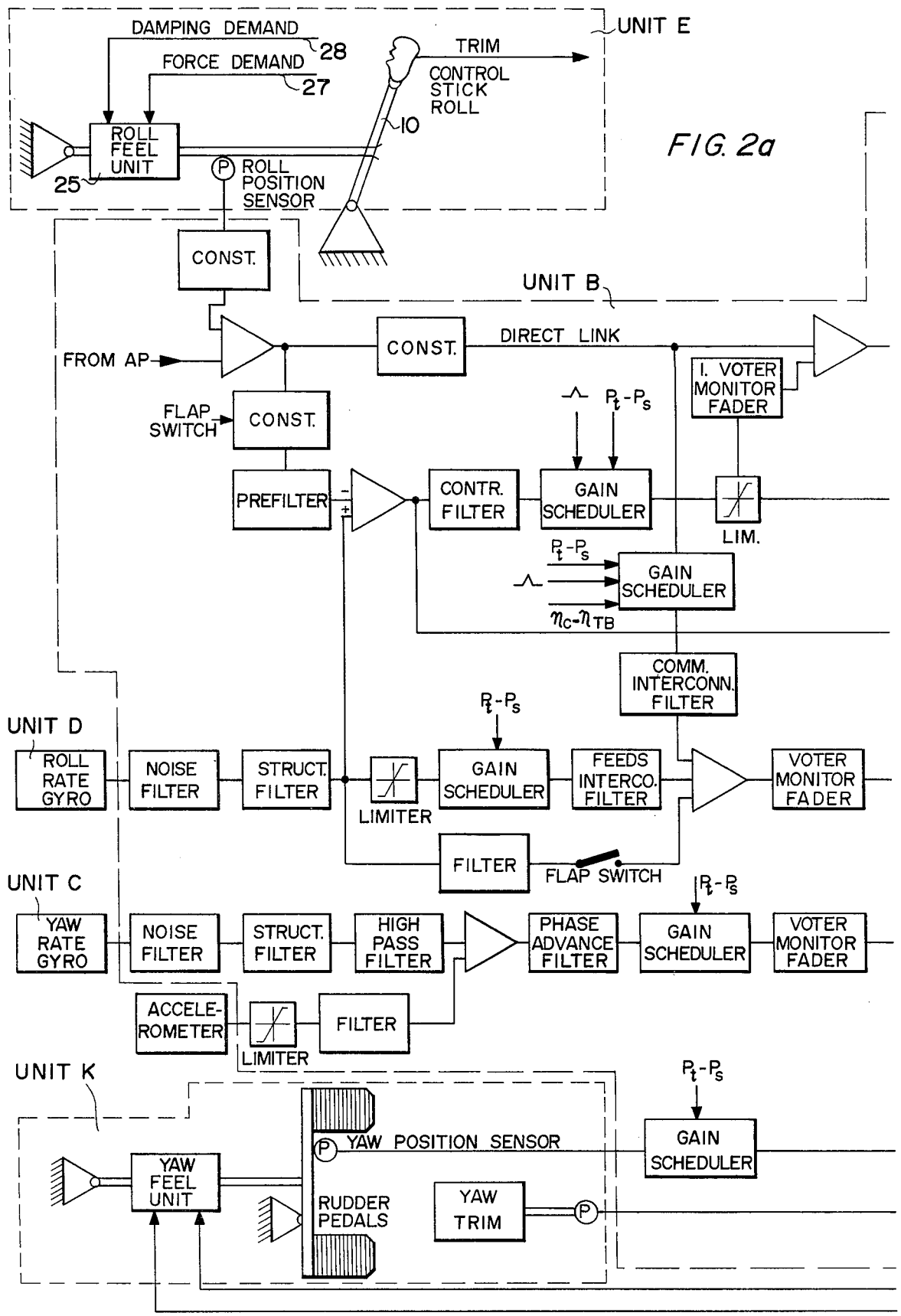
FIGS. 2a and 2b show a block circuit diagram of a controlled steering circuit for the lateral or directional control.
Figure 2B:
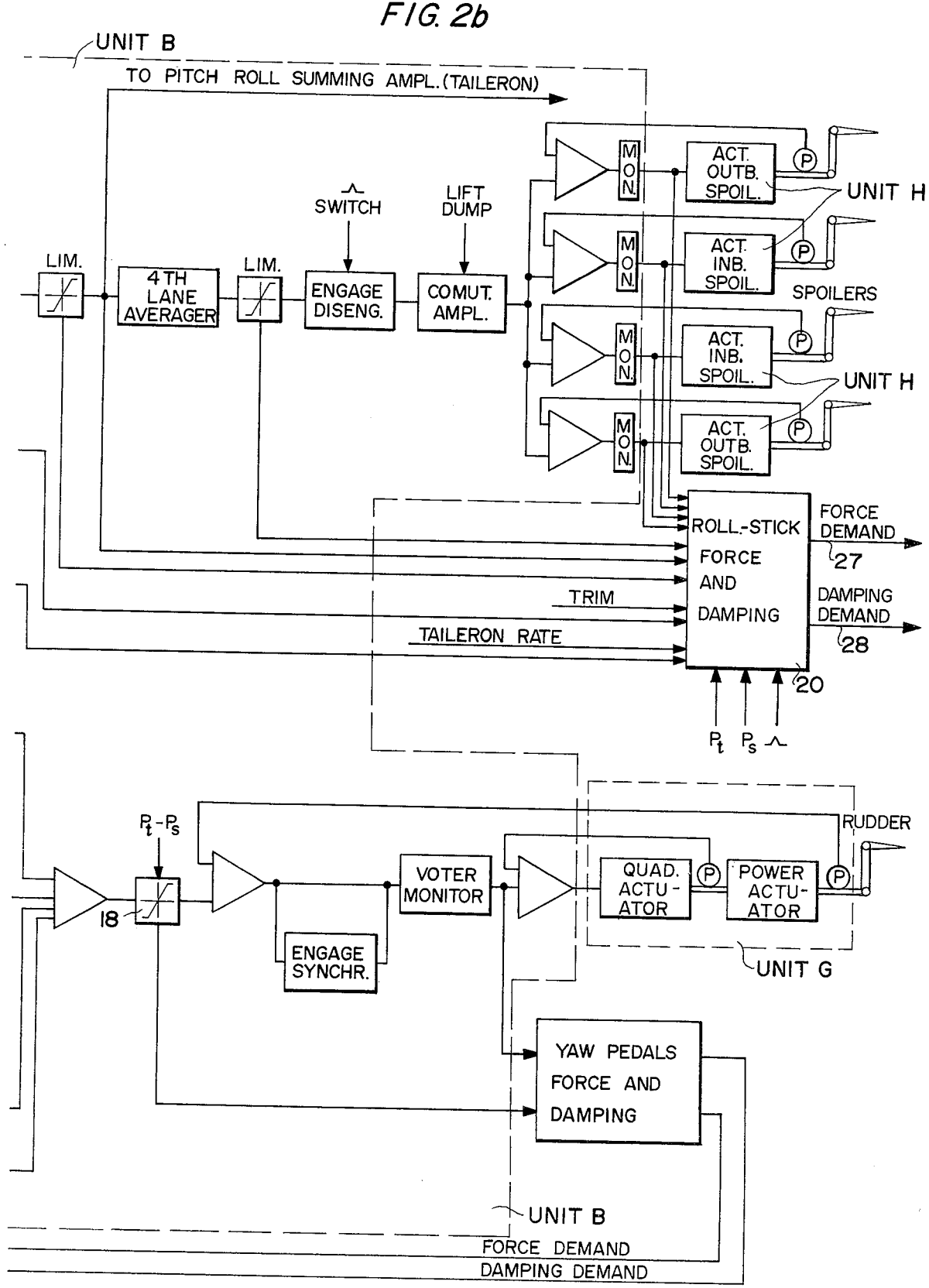

The steering system illustrated in FIGS. 2a and 2b is constructed substantially in the same manner as that shown in FIG. 1. Specifically, the signal providing means such as the roll position sensor, the signal processing means such as the differential amplifier and so forth, and the steering means are substantially identical in their structure and function for the elevational and directional control of the aircraft.

The system illustrated in present FIGS. 1a, 1b, 2a, and 2b is especially adapted for use in combination with an analog type steering system. However, the invention is also suitable for use in digital electrical steering systems especially since the required parameters may be produced even easier and still more precisely in a digital electrical steering system.

The above mentioned steering information representing signals which are used in the mentioned example for producing the force demand signal on the conductor 27 and the damping demand signal on the conductor 28 may be varied depending on the particular problem to be solved. It is essential however, that the signals which are used for modifying the damping demand signal and the force demand signal define the instantaneous steering condition with the required precision in order to inform the pilot regarding the instantaneous flight condition of the aircraft, especially its dynamic condition by applying corresponding counter forces and damping effects to the steering member used by the pilot, namely, the control stick 10.

The signals selected for modifying the force demand signal and the damping demand signal must also prevent the pilot from driving the entire system into static and dynamic saturation. Stated differently, the system must prevent the occurrence of phase angles in the steering or control circuit of the aircraft which are so large that the system would exceed its operational capability limits or that the system generates resonance vibrations (e.g., Pilot Induced Oscillations, P.I.O.).

Incidentally, in FIGS. 1a, 1b, 2a, and 2b, the various blocks are designated by their internationally accepted nomenclature so that a more detailed description of the structure and function of these block circuits is not necessary.

Figure 3:
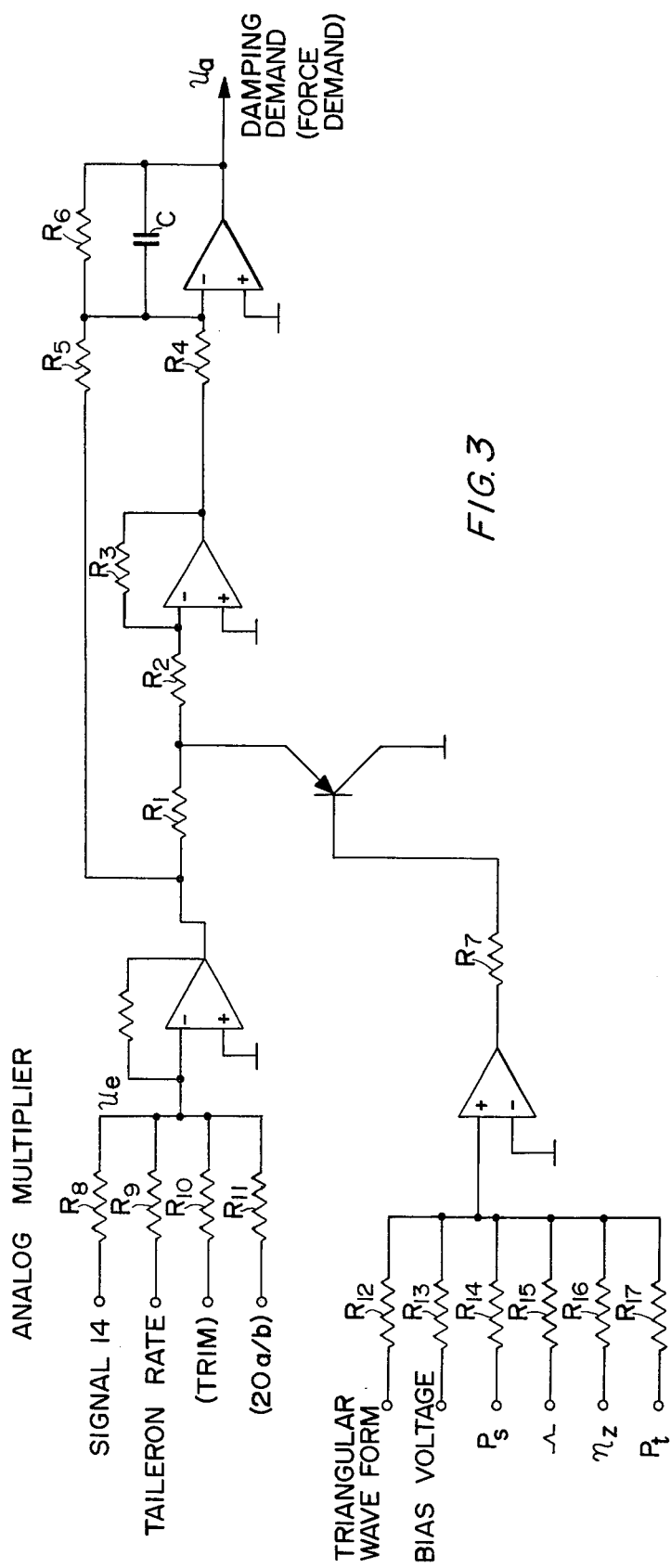
FIG. 3 is a circuit arrangement of an analog multiplier for use in the pitch stick force and damping circuit shown in block form in FIGS. 1a, 1b, 2a and 2b.

FIG. 3 illustrates a so-called four quadrant analog multiplier which may be used in the pitch stick force and damping circuit 20. Such analog multipliers are, for example, sold by "Analog Devices" Model Number AD 534. The individual analog multipliers will be selected, or rather will be provided with the desired characteristic adapted to the particular type of aircraft.

The resistors $R_1$ to $R_{14}$ have to be selected in accordance with the required multiplication factor and curved functions following the suppliers manual. The example shown provides "damping demand" when the signals "14" and "taileron rate" are connected. The example provides a "force demand" when signals (trim) and (20a/b) are connected.

Although the invention has been described with reference to specific example embodiments, it will be appreciated that it is intended to cover all modifications and equivalents within the scope of the appended claims.

What is claimed is:

1. The steering mechanism with an active force feedback, especially for an aircraft, comprising a manual steering means, automatic steering means, signal providing means including pitch position sensor means (10') operatively connected to said manual steering means to provide a pilot trim control signal, pitch rate gyro means (13) providing a gyro feedback signal, signal processing means including differential amplifier means (12) operatively connected to said pitch position sensor means and to said pitch rate gyro means for providing a difference output signal, force control and damping circuit means (20), authority limit circuit means (18) operatively connecting said difference output signal of said differential amplifier means (12) to said force control and damping circuit means (20), and means directly connecting the output of said differential amplifier means to said force control and damping circuit means, further circuit means (19a, 19b, 23, 24) operatively connecting said authority limit circuit means (18) to said automatic steering means, said signal providing means comprising means for supplying an additional input signal or signals to said force control and damping circuit means (20), and feedback circuit means for supplying output signals from said force control and damping circuit means (20) to said manual steering means.

2. The steering mechanism of claim 1, wherein said signal supplying means supply a static pressure representing signal ($P_s$) to said force control and damping circuit means (20).

3. The steering mechanism of claim 1, wherein said signal supplying means supply a pressure altitude representing signal ($P_t$) to said force control and damping circuit means.

4. The steering mechanism of claim 1, wherein said signal supplying means supply a normal acceleration representing signal ($\eta_z$) to said force control and damping circuit means.

5. The steering mechanism of claim 1, wherein said automatic steering means comprise servomotor means, and wherein said signal supplying means supply a signal representing the speed of said servometer means to said force control and damping circuit means (20).

6. The steering mechanism of claim 1, wherein said signal providing means, said signal processing means, and said automatic steering means are substantially identical in their structure and function for the elevational and directional control of the aircraft.

* * * * *